United States Patent [19]

Arens et al.

[11] 4,433,397

[45] Feb. 21, 1984

[54] CIRCUIT ARRANGEMENT FOR THE FORMATION AND PROCESSING OF GROUP SIGNALS

[75] Inventors: Egidius Arens, Achim; Ravin Patel, Achim-Bierden, both of Fed. Rep. of Germany

[73] Assignee: Fried. Krupp Gesellschaft mit beschränkter Haftung, Essen, Fed. Rep. of Germany

[21] Appl. No.: 331,885

[22] Filed: Dec. 17, 1981

[30] Foreign Application Priority Data

Dec. 20, 1980 [DE] Fed. Rep. of Germany ....... 3048240

[51] Int. Cl.³ .......................... G01S 3/80; G01S 3/00
[52] U.S. Cl. ................................... 367/122; 367/123; 367/126
[58] Field of Search ................ 367/122, 123, 126, 135

[56] References Cited

U.S. PATENT DOCUMENTS 3,810,082  5/1974  Arens .................................. 367/122

Primary Examiner—Richard A. Farley
Attorney, Agent, or Firm—Spencer & Frank

[57] ABSTRACT

A circuit arrangement for forming a succession of group signals in the ranging art from received signals originating from an array of adjacent signal receiving transducers, each successive group signal being associated with a respective group characteristic and being based on the signals received by a respective group of adjacent transducers forming part of the array. The succession of group signals is processed to form a representation of the mean, or average, value of a predetermined number of successive group signals, and a representation of the ratio of the value of one of the group signals of that predetermined number of signals to the mean value is produced.

10 Claims, 5 Drawing Figures

CIRCUIT ARRANGEMENT FOR THE FORMATION AND PROCESSING OF GROUP SIGNALS

BACKGROUND OF THE INVENTION

The present invention relates to a circuit arrangement for the formation of group signals following each other in time for use in direction finding systems, particularly involving sound wave propagation in water.

Circuit arrangements of the type under consideration, one example of which is disclosed in U.S. Pat. No. 3,810,082, can include a receiving system having a circular array of receiving transducers. A selected group of the transducers, which is located on the arc of the circle defining the locus of the array, is used for forming a group characteristic.

The received signals of the transducers of one group each are delayed for the formation of a group signal as though the transducers were not arranged on the arc but on the corresponding chord. This chord is located normally to the direction of the group characteristic associated with this transducer group. The received signals of these transducers of a group, which are correctly delayed in time, form, when summed up, the group signal belonging to this group characteristic.

In accordance with the above-cited patent, all transducers of the receiving system are interrogated for this compensation in an adjacent sequence in a repeated manner with clock pulses and their momentary signals received are read into a memory at the same rate through a read-in point and they are shifted in the memory in the course of the interrogation continuously further away from the read-in point. Selected memory locations are read-out to an adder whose output presents group signals which appear successively in the same rhythm as the interrogation whereby a direction, or an angle, is to be assigned to each group signal.

Different circuit arrangements are known for the evaluation of such group signals in the technology for sound wave propagation in water for the purpose of processing, particularly for the removal of noise, which use multiplicative methods.

SUMMARY OF THE INVENTION

It is an object of the present invention to provide a novel circuit arrangement which is especially advantageous for the processing of the group signals formed according to the above-cited patent since it organically follows the typical formation of the group signals, i.e. by continuous shifting between memory locations.

It is already known to evaluate in time, and in parallel, group signals following each other successively in time by feeding the group signals for each group characteristic into one processing channel each. The number of processing channels is then equal to the number of group characteristics. Furthermore, it is known to free group signals of a group characteristic from their noise portions by multiplication and subsequent integration. Since one processing channel with multiplicator and subsequent integrator must be provided per group characteristic for this processing of the group signals, the circuit technology is very complex.

A further object of the invention is to provide a circuit arrangement for the processing of the group signals following each other in time which handles the group signals in time series and consists of only one processing channel in spite of the multitude of different group characteristics.

The above and other objects are achieved, according to the invention, in a circuit arrangement for forming a succession of group signals in the ranging art for a momentarily effective characteristic of a group of adjacent group characteristics obtained from received signals originating from a number n of adjacently aligned transducers from a larger plurality of m transducers in a signal receiving system, the group signals being formed by varied, quantized time delays determined by the geometric arrangement of the plurality of m transducers in the signal receiving system and by the propagation speed of impinging signals in the transmission medium, the circuit arrangement including:

an input circuit coupled to the plurality of m transducers for the repeated, consecutive interrogation of each individual transducer in succession to derive correspondingly successive received signal values, the input circuit having a single output for providing representations of the received signal values in the order in which they are derived;

a memory circuit having one read-in point coupled to the single output of the input circuit, the memory circuit being provided with a plurality of memory locations which are sequentially removed from the read-in point and each of which is capable of storing one received signal value representation, the number of memory locations being at least determined by the maximum time delay which must be imparted to the first interrogated received signal value, for storing each signal value representation appearing at the output of the input circuit in succession so that each such representation, after read-in to the memory circuit, consecutively occupies in steps the memory locations which are further removed from the read-in point;

an output circuit coupled to the memory circuit for the non-destructive read-out of stored representations of interrogated signal values which were received from a number n of adjacent transducers, from those of the memory locations which correspond to required time delays with respect to the read-in point; and an adding circuit coupled to the output circuit and responsive to signals therefrom, and having an output at which appears successive group signals for a corresponding succession of adjacent group characteristics, by the further provision of:

an integrating circuit connected to the output of the adding circuit for forming a representation of the mean value of a predetermined number of successive group signals;

a time delay member connected to the output of the adding circuit for delaying each group signal appearing at the adding circuit means output by a selected time which is no greater than the time interval over which the predetermined number of successive group signals appear at the adding circuit means output; and a ratio forming member having inputs connected to receive each representation formed by the integrating circuit and each delayed signal from the time delay member and having an output at which appears a representation of the signal to noise ratio of each successive group signal appearing at the output of the adding circuit.

With a circular arrangement of the transducers, group signals for group characteristics located next to each other whose directions enclose an angle determined by the distance between the transducers appear successively at the output of the adder in accordance with clock pulses having a clock frequency at which the received signals of the transducers are interrogated. Each group signal provides a momentary value in time of the wave energy received for the group characteristic. An evaluation of the group signals for a group characteristic is achieved with the circuit arrangement according to the invention by the fact that the noise background is determined within an angular sector in which the group characteristic is located and is put into relation to the group signal for this group characteristic. This relation indicates the signal to noise ratio of the group signal.

Since the directions of the group characteristics are always offset from one another by the same angles, a predetermined number of group characteristics corresponds to an angular sector in which an angle is assigned to each group signal of this number within the angular sector. The group signals which appear successively in time at the output of the adder are, therefore, each a function of the associated angle from the mathematical point of view. These group signals are integrated over the angle in the integrating circuit whereby the number of the group characteristics through which the mean value formation is effected indicates the size of the angular sector.

The integrating circuit stores successively the group signals for the mean value formation, adds up the group signals for the given number of adjacent group characteristics and divides by this number. The result is the arithmetic mean value of the group signals. When no target noise is received in the angular sector, the mean value of the group signals directly represents the noise background.

When a target signal is received within the angular sector of a group characteristic, the pertinent group signal is considerably larger than the group signals of the adjacent group characteristics. However, with the arithmetic mean value formation, all values of the group signals are added and divided by the number of values so that also the target noise within the sum of the values is divided by the number and, thus, does not supply a considerably large portion to the entire mean value formation.

A group characteristic is selected within the angular sector for the formation of the ratio. The storage time of the delay element is selected as a function of its angular position within the angular sector. That time is to be selected as a maximum storage time within all which group characteristics in the relevant angular sector are interrogated. In the ratio forming unit, the group signal of a group characteristic located in the angular sector is placed into relation with the noise background in the angular sector. It is particularly expedient to compare the group signal of the group characteristic located in the center of the angular sector with the noise background in the angular sector. For this purpose, the storage time of the delay element is made equal to half the maximum storage time. Also a storage time of zero is admissible. Then, the group signal for the group characteristic at the rear limit of the angular sector which appears at the output of the adder is placed into a relation with the mean value of the group signals of all group characteristics within the angular sector. A storage time equal to the maximum storage time leads to comparison of the group signal at the front limit of the angular sector.

According to an advantageous further development of the invention, the integrating circuit may consist of a storage arrangement which receives successively the values of the group signals from the adder. The values of a predetermined number of the group signals can be stored in the storage arrangement so that always the oldest stored value is replaced by the momentary value at the output of the adder. The storage arrangement is followed by a calculating circuit for the formation of the sum of all stored values and for the division by the predetermined number. The delay element is controlled, in this case, by the same clock frequency with which the values of the group signals appear at the exit of the adder. Its storage time is adjustable by the clock frequency and by selection of the number of memory locations located one behind the other. For the purpose of delay, each signal value passes through the selected number of memory locations.

With the reading of each new group signal into the integrating circuit, the angular sector over which the noise background is determined is pivoted by the angle between two adjacent group characteristics and a new mean value is formed. At the same time, the delayed group signal appearing at the output of the delay element is for a group characteristic whose direction if pivoted by the same angle relative to the previously considered group characteristic.

The position of the angular sector is stationary relative to each considered group characteristic. Relative to the circular arrangement of the transducers, the angular sector turns together with the direction of the momentary group characteristic so that the entire circle about which targets are to be intercepted is covered by the angular sector and all group signals appear processed in a successive manner at the output of the ratio forming unit.

The special advantage of this circuit arrangement lies in the fact that the group signals, as they are supplied by the adder, are immediately processed in the same rhythm.

It is particularly expedient to build up the memory circuit with the predetermined number of memory locations connected one behind the other and controlled by the clock frequency. In this way, the entire stored content advances by one memory location with the storing of each new value whereby the value which has already passed through all locations is read out. All memory locations are connected with the calculating stage which puts out a new mean value to the ratio forming unit with each clock pulse.

With such a structure of the memory circuit, it is advantageous to utilize the memory locations placed behind each other, at the same time, as a delay element. The storage time which is equal to the number of memory locations divided by the clock frequency is selected in accordance with the desired position of each group characteristic in its associated angular sector.

The observation of a selected angular sector is of special interest for certain tasks in direction finding technology, for example, for the tracking of a target. For this application, a circuit arrangement according to an advantageous further development of the invention has the integrating circuit and the delay element controlled through gates under control of a counter. The counter is acted upon by the clock pulses with which the received signals are read into the memory. The integrating circuit consists here of a memory circuit for the values of the group signals as well as a subsequent summing and dividing circuit for the formation of the sum of the values and division by the predetermined number. It is controlled by the clock pulses. The delay element is a memory stage for the same number of values of the group signals.

At a first counter output state, or count, the gates are opened, or enabled, for the storing of the values of the group signals and, after the counting of the predetermined number of clock pulses, when a second counter, output state, or count, has been reached, the gates are closed again. Because of this measure, only group signals for group characteristics in predetermined angular sector are evaluated. The first counter output state corresponds to the forward limit of the angular sector within which the group characteristics to be evaluated are located. The second counter output state is then reached when all group signals of the group characteristic of the angular sector are stored.

Subsequently, the mean value is formed in the integrating circuit from the stored values. The stored values of the group signals are now read out successively from the delay element and delivered to the ratio forming unit which always forms a representation of the signal to noise ratio for the group signals of the group characteristics in the angular sector.

It is particularly advantageous to build up the memory circuit of the integrating circuit and the memory stage of the delay element as a joint shifting memory whose capacity is designed for the storage of the predetermined number of values. This shifting storage is controlled by the clock pulses.

According to an advantageous further development of the invention, the ratio forming unit is implemented by two logarithm function stages followed by a difference forming unit. The logarithm of the signal to noise ratio of the group signals appears always at its output. This output signal thus has a dynamic compression which is particularly advantageous for a display on the screen of a cathode ray tube, which has limited intensity dynamics.

The noise background which is determined within the angular sector can be obtained not only by means of an arithmetic mean value formation but also by many of a geometric mean value formation using a simplification of the circuit arrangement according to the invention. With the geometric mean value formation, the values of the group signals of the group characteristics located within the angular sector are multiplied and the root is extracted in accordance with the number of the considered group characteristics. For this purpose, the group signals are connected to the integrating circuit and the delay element through a logarithm function amplifier. In this instance, the ratio forming unit is expediently designed as a difference stage.

A very good bundling of the group characteristics is obtained with the circuit arrangement for the formation of group signals following each other successively in time according to the above-cited U.S. patent so that the removal of noise is already guaranteed by this measure.

By means of the invention, each group signal is related to the noise background of an azimuthal neighboring area whose size can be given in advance using only a little additional circuitry. The output signal of the circuit arrangement according to the invention indicates directly the signal to noise ratio for each group signal. A special advantage of the invention consists of the fact that the assessment of the received wave energy is especially simple on the basis of the signal to noise ratio. A sequence of output signals which has a maximum shows which of the group characteristics points toward a target so that a further evaluation of the group signal with the highest signal to noise ratio can be performed, for example, for target tracking.

With a threshold which can be selected dependent on the desired false alarm rate, group signals with a low signal to noise ratio can be easily recognized independently of the absolute value of the received wave energy and can be separated for additional signal processing.

Since a larger number of group characteristics is used for the integration over the angle which covers a larger angular sector than the azimuthal extension of a target, the noise background can be easily determined with a simple mean value formation. It is, furthermore, advantageous that the size of the angular sector can be selected in advance in the integrating circuit by the number of the group characteristics as the integration interval and that the position of the group characteristic can be selected in relation to the angular sector by the storage time of the delay element. Also after the entire direction finding system is put into operation, the integration interval and storage time are easily varied, in dependence on changing environmental conditions, both parameters can be varied, for example, by varying a frequency derived from the clock pulse frequency for the formation of the group signals.

DESCRIPTION OF THE PREFERRED EMBODIMENTS

Figure 1:
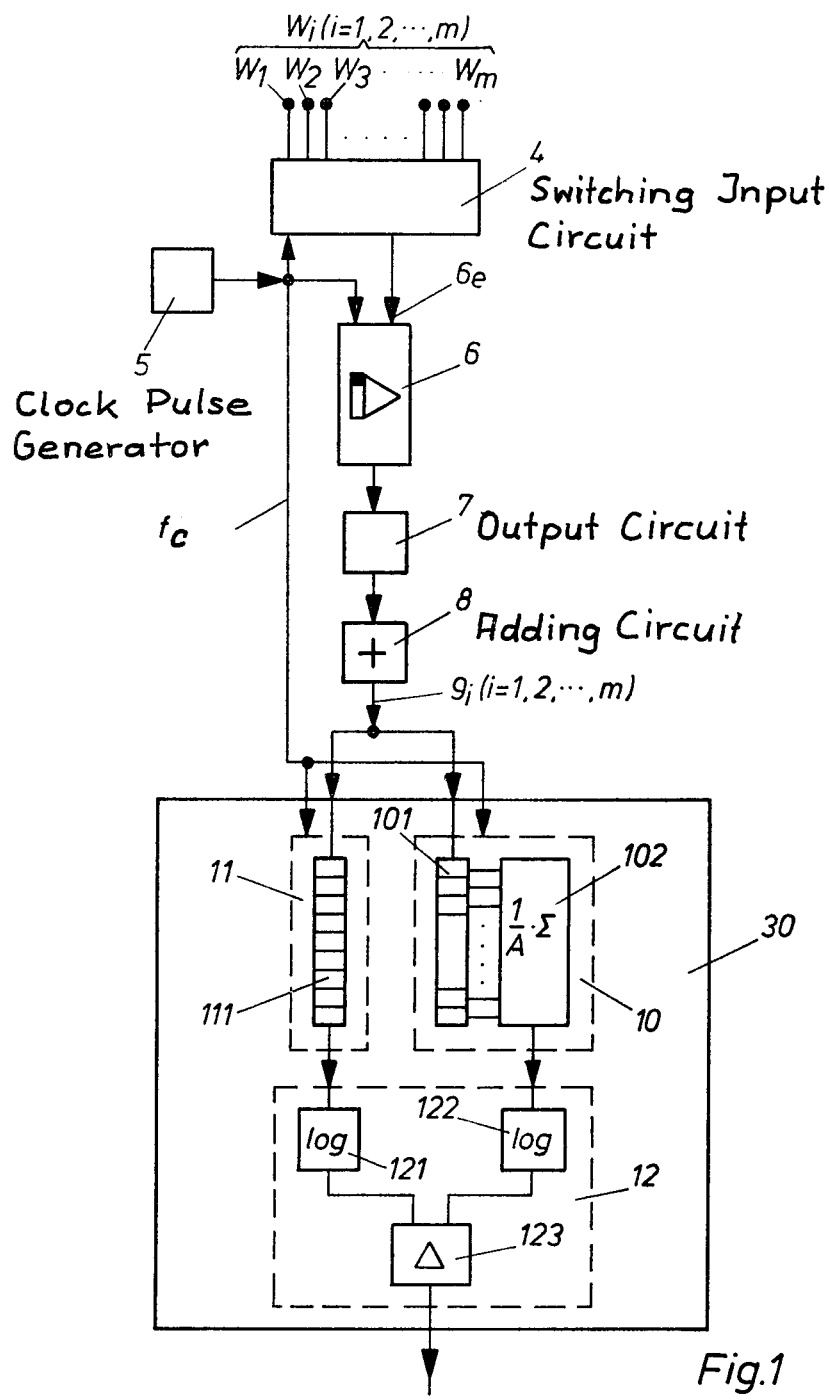
FIG. 1 is a block circuit diagram of one preferred embodiment of a circuit arrangement according to the invention for the formation of group signals following each other in time.

For the formation of group signals $9i$ ($i=1,2,\ldots,m$) at the output of an adder 8 in the circuit of FIG. 1, transducers Wi ($i=1, 2, \ldots, m$) of a receiving system are successively and repeatedly interrogated at the rate $f_c$ of clock pulses from a clock pulse generator 5, by means of an input switching circuit 4. The successively interrogated signals are read into a memory circuit 6 via a single read-in point $6e$ in the sequence of their interrogation. Within the memory circuit 6, which consists of a plurality of series connected memory locations, and each read-in signal moves by one memory location away from the read-in point $6e$ in a step-by-step manner in response to each clock pulse produced by clock generator 5. The delayed received signals are read out of the memory circuit 6 by means of an output circuit 7 and supplied to the adder 8. All of the components described above and their operation can be the same as those of similarly numbered components in the above-cited U.S. Pat. No. 3,810,082.

Each of the group signals $9i$ is associated with a respective one of a plurality of group characteristics adjacent to each other. Always after a cycle period T, which equals the number of transducers m divided by the clock frequency, $f_c$, i.e. after an interrogation cycle for all m transducers Wi, group signals $9i$ appear at the output of the adder 8 which belong to the very same group characteristic. Subsequently, after a step time $\tau$ which is equal to the reciprocal value of the clock frequency, $f_c$, a group signal 9(i+1) for the next adjacent group characteristic in the direction of interrogation of the transducers Wi. Synchronously with the scanning of all m transducers Wi, the different group signals 9i for the m group characteristics are to be taken off at the output of the adder 8 for processing and evaluating, as described in the above-cited patent.

The adder 8 is followed by a processing circuit arrangement 30 for the processing of the group signals 9i before an additional evaluation. It consists of an integrating circuit 10, a delay element 11 and a subsequent ratio forming unit 12. The signal-to-noise ratio of the group signals 9i appears at the output of the ratio forming unit 12 in the rhythm of the clock frequency $f_c$.

The integrating circuit 10 for the determination of the mean value of the group signals consists of a memory circuit 101 and a subsequent calculating stage 102 and is controlled by the output of clock generator 5. The successive group signals 9i are read into the memory circuit 101 in the rhythm of the clock frequency $f_c$. The memory circuit 101 is designed in such a manner that it can just accommodate a predetermined number A of group signals 9i. The A signal values stored in the memory circuit 101 are summed in the calculating stage 102 and divided by the number A. The mean value of the values of the A group signals 9i appears at the output of the calculation stage 102 which forms the output of the integrating circuit 10.

The delay element 11 is a memory circuit which has a plurality of memory locations 111 connected in series and is controlled by the clock frequency $f_c$. The delay or storage time, respectively, of the delay element 11 is determined by the selected number of memory locations 111 divided by the clock frequency $f_c$.

Preferably, a storage time is selected which is equal to A/2 $f_c$, i.e. the number of locations 111 is equal to A/2. The delayed group signal 9i for the group characteristic to be evaluated appears at the output of the delay element 11 after it has passed through all of the memory locations 111 in the rhythm of the clock frequency $f_c$.

Figure 2:
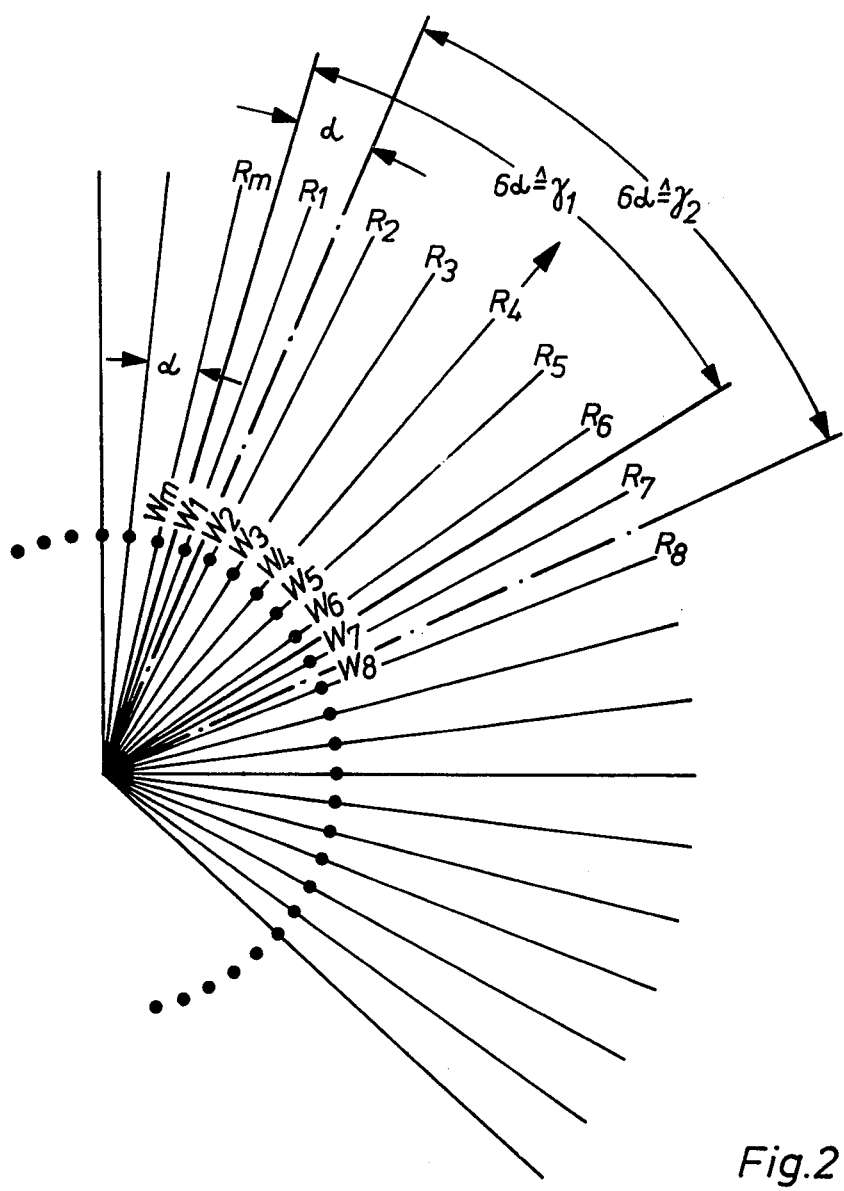
FIG. 2 diagrammatically illustrates part of a circular receiver arrangement.

FIG. 2 shows part of a circular transducer arrangement formed of transducers W1, W2, ..., Wm. Group signals 9i are formed for the group characteristics with the directions R1, R2, ..., Rm from the received signals. The directions R1 and R2 or R2 and R3, ..., of two adjacent group characteristics form each an angle $\alpha$. The directions R1 to R6 are in an angular sector $\gamma_1$ with a magnitude of 6. The directions R2 to R7 are located within an equally large angular sector $\gamma_2$ which is shifted by the angle $\alpha$ from the first angular sector $\gamma_1$.

In the processing circuit arrangement 30, the mean value is formed from a predetermined number A of group signals 9i, for example, from A=6 group signals 9i, in order to determine the noise background within an angular sector $\gamma_i$ (i=1,2, ..., m). These six group signals belong to six group characteristics, for example, those having the directions R1 to R6. The six group signals 9i appear in succession at the output of the adder 8 and are read into the memory 101 of integrating circuit 10 at the clock frequency $f_c$. In the integrating circuit 10, these six group signals 9i are added and divided by six so that wave energy which was received within the angular sector $\gamma_1$ is used for the determination of the noise background. At the same time, the six group signals 9i pass through the delay element 11. If the group signal 9i for the group characteristic which is located in the center of the first angular sector $\gamma_1$ and points in the direction R4 is to be placed in relation to the noise background in the angular sector $\gamma_1$, the storage time of the delay element amounts to 6/2 $f_c$. While the group signal 96 for the group characteristic with the direction R6 is being read in to the delay element 11 and the integrating circuit 10, the group signal 94 for the group characteristic with the direction R4 appears with this selected storage time at the output of the delay element 11 and is placed into relation to the mean value in the ratio forming unit 12. This mean value appears then at the output of the integrating circuit 10.

With the next clock pulse, the group signal 91 for the group characteristic which points in the direction R1 is read out of the integrating circuit 10, and the group signal 97 for the group characteristic with the direction R7 is read in. Now, the mean value formation is effected on the basis of six group signals 9i for the group characteristics with the directions R2 to R7. Thus, the noise background in the angular sector $\gamma_2$, which is shown by a chain line in FIG. 2, is determined. At the same time, the group signal 95 for the group characteristic with the direction R5 appears at the output of the delay element 11 and it is placed into relation to the noise background in the angular sector $\gamma_2$. This group signal 95 is located approximately in the center of the angular sector $\gamma_2$. With the next clock pulse, the next angular sector which is offset by the angle $\alpha$ from the angular sector $\gamma_2$ and the group signal 96 for the group characteristic with the direction R6 are considered in order to determine the signal-to-noise ratio.

The group characteristic of the evaluated group signal 9i is located in the center of the angular sector $\gamma_i$ with a correspondingly selected storage time.

With each clock pulse, the angular sector $\gamma_i$ is pivoted by an angle $\alpha$ as is the group characteristic which is to be evaluated. During one cycle period T, in the course of which all m transducers Wi are interrogated once, a full circle is scanned by the angular sector $\gamma_i$ and the signal-to-noise ratio of the group signals 9i for all group characteristics appears at the output of the circuit arrangement.

By selecting the storage time of delay element 11, the group characteristic to be evaluated within each angular sector $\gamma_i$ can be selected. With a maximum storage time of $6/f_c$, the group characteristic at the front limit of the associated angular sector $\gamma_i$ is always placed into relation with the group signals 9i of the five successive group characteristics. With a storage time of zero, the group characteristic which is located at the rear limit of the angular sector $\gamma_i$ is always placed into relation with the noise background within the angular sector $\gamma_i$.

Reverting to FIG. 1, the ratio forming unit 12 is particularly simple from the circuitry point of view in that it consists of two logarithm function stages 121 and 122, each of which follows a respective one of the delay element 11 and the integrating circuit 10, and a difference forming unit 12 connected to the outputs of stages 121 and 122. The logarithm of the resulting ratio can then be taken off at the output of the ratio forming unit 12.

Figure 3:
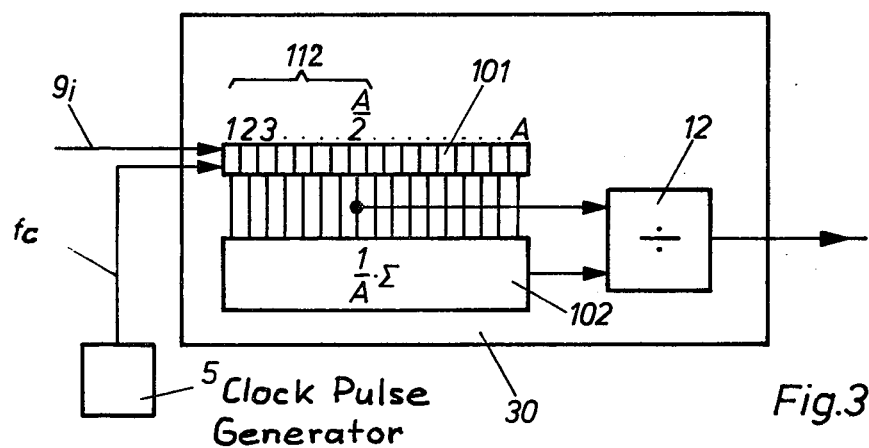
FIGS. 3–5 are block circuit diagrams of three further embodiments of processing circuits according to the invention.

FIG. 3 shows an additional exemplary embodiment of the processing circuit arrangement 30. The group signals 9i are stored in the memory circuit 101 at the clock frequency $f_c$. The memory circuit 101 comprises, for example, A=6 memory locations. The outputs of all six memory locations are connected with the calculating stage 102 whose output is connected to one input of the ratio forming unit 12. The memory circuit 101 and the calculating stage 102 form the integrating circuit 10. The delay element 11 is implemented, in this exemplified embodiment, by a group 112 of the memory locations of circuit 101. The number in Group 112 amounts, preferably, to A/2 = 3. These 3 memory locations extend from the input of the memory circuit 101 to the output of the memory location A/2 and form the delay element corresponding to element 11 of FIG. 1. The output of the memory location A/2 is connected to a second input of the ratio forming unit 12. A group signal 9$i$ passes through the three storage cells always within the storage time A/2 $f_c$ = 6/2 $f_c$ and comes out at the output of the memory location cell A/2. The calculating stage 102 forms the mean value of the A = 6 values of the group signal 9$i$ which are then in the memory circuit 101.

With the read-in of each new value in the first memory location and shifting of previously read-in signals to adjacent locations, each value is pushed on by one memory location. The next group signal 9$i$ delayed by the time A/2 $f_c$ appears at the output of the memory location A/2. The pertinent group characteristic is always substantially in the center of the angular sector $\gamma_1$ which is pivoted through angle on a step-by-step basis at the clock frequency.

Figure 4:
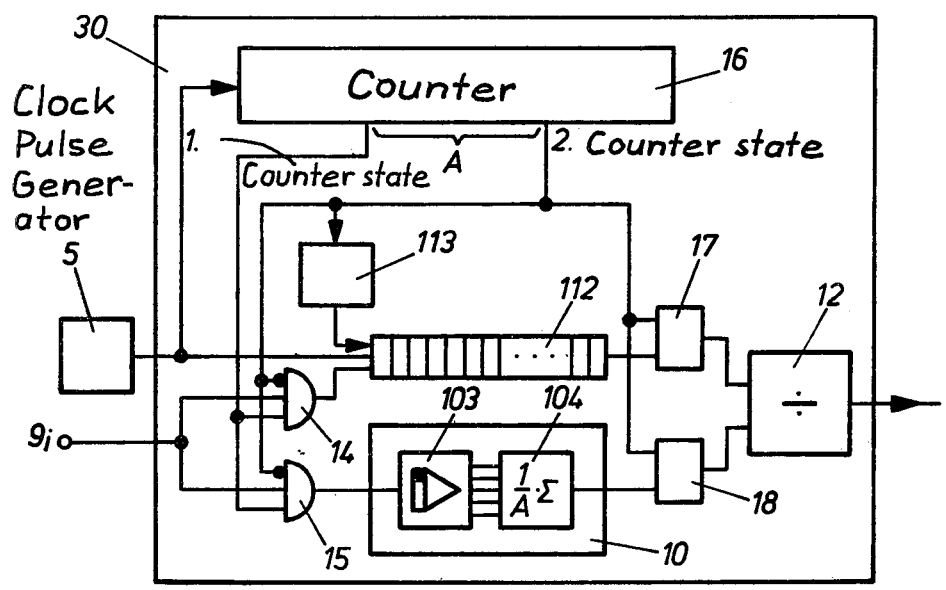

FIG. 4 shows a block diagram of a third embodiment of the processing circuit arrangement 30 with which only group signals 9$i$ for a selected angular sector are subjected to an evaluation. The integrating circuit 10 consists here of a memory circuit 103 and a subsequent summing and dividing circuit 104. The memory circuit 103 is designed in such a fashion that the group signals 9$i$ (i = 1,2, ..., A) for A groups are taken up by it. In the summing and dividing circuit 104, the A values are added from the memory circuit 103 and divided by the value A.

The delay element 11 is built up as a memory circuit 112 for the storage of A group signals 9$i$. The memory circuits 103 and 112 can be controlled, via gates 14 and 15 connected to their signal inputs, by a counter 16. Each gate has two inputs connected to two counter state outputs of the counter 16. When the first counter state is reached, the gates 14 and 15 are opened and when the second counter state is reached, they are blocked again. Group signals 9$i$ enter the integrating circuit 10 and the delay memory circuit 112 through the gates 14 and 15 after the first counter state has been reached in the counter 16. The delay element 11 and the circuit 112 are connected, on their output side, with the ratio forming unit 12 through further gate circuits 17 and 18. The gate circuits 17 and 18 are connected to the second counter state output of the counter 16 for the second counter position and are opened, i.e. enabled, after the second counter state has been reached.

The counter 16 is connected to the clock generator 5 and counts clock pulses at the exit of the clock pulse generator 5. After a one-time interrogation of all transducers Wi (i = 1.2, ..., m), the counter 16 is reset to zero. The values of the group signals 9$i$ appear at the output of the adder 8 in the rhythm of the interrogation of the transducers Wi so that the individual directions R1, R2, ..., Rm of the group characteristics are interrogated in the same rhythm. A direction R1, R2, ... is to be assigned to each counter output state. With the observation of an angular sector $\gamma_1$ which includes the directions R1 to R6 according to FIG. 2, only group signals 9$i$(i = 1 ... 6) shall be evaluated within this angular sector $\gamma_1$ with the processing circuit arrangement 30 according to FIG. 4. The first counter state corresponds then to the direction R1 and the second counter state, reached after the counting of A = 6 clock pulses, to the direction R6.

The gates 14 and 15 are opened, i.e. enabled, when the first counter state is reached so that the group signals 9$i$ of the group characteristics with the direction R1 to R6 can be stored. After the termination of A = 6 clock pulses, the gates 14 and 15 are closed, or blocked, again. At the latter time, the gate circuits 17 and 18 are opened. The mean value of the A = 6 group signals 9$i$ is formed in the integrating circuit 10 and passed through the gate circuit 18 to the ratio forming unit 12. The values in the memory circuit 112 forming the delay element are read out by a reading pulse generator 113 which is controlled by the second output state of the counter 16 and reach the ratio forming unit 12 through the gate circuit 17 in order to provide an output for the group signals 9$i$ for the selected angular sector $\gamma_1$. The memory circuits 103 and 112 can also be designed as joint shifting storage. With each pulse of the reading pulse generator 113 one of the six stored group signals 9$i$ appears at the input of the ratio forming unit 12 in order to be evaluated. After six pulses all group signals 9$i$ of the selected angular sector $\gamma_1$ are read out of the memory circuit 112 and the next angular sector $\gamma_i$ may be chosen.

Figure 5:
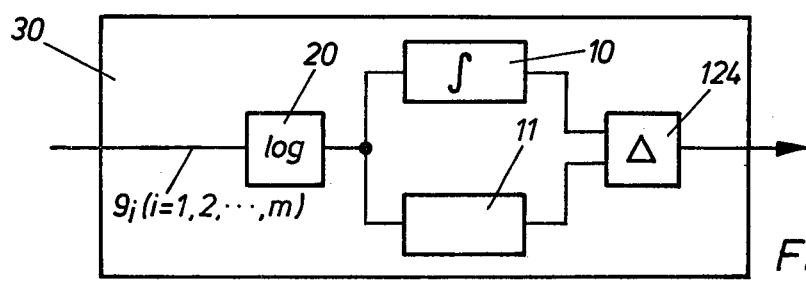

FIG. 5 shows a fourth embodiment of the processing circuit arrangement 30 where the removal of noise from the group signals 9$i$ is effected by a geometric mean value formation. The groups signals 9$i$ are supplied to the integrating circuit 10 and to the delay element 11 through a logarithm function amplifier 20 and the outputs of circuit 10 and element 11 are applied to a subsequent difference stage 124. The logarithm of the group signal 9$i$, relative to the product of the group signals 9$i$ (i = 1.2, ..., A) in the angular sector of which the Ath-root is extracted by division by the value A, appears at the output of the difference stage 124 with each clock pulse whereby the location of the pertinent group characteristic within the angular sector is determined by the storage time set in the delay element 11. The integrator 10 has the same structure as shown in FIG. 1.

It will be understood that the above description of the present invention is susceptible to various modifications, changes and adaptations, and the same are intended to be comprehended within the meaning and range of equivalents of the appended claims.

What is claimed is:

1. In a circuit arrangement for forming a succession of group signals in the ranging art for a momentarily effective characteristic of a group of adjacent group characteristics obtained from received signals originating from a number n of adjacently aligned transducers from a larger plurality of m transducers in a signal receiving system, the group signals being formed by varied, quantized time delays determined by the geometric arrangement of the plurality of m transducers in the signal receiving system and by the propagation speed of impinging signals in the transmission medium, the circuit arrangement including:

input circuit means coupled to the plurality of m transducers for the repeated, consecutive interrogation of each individual transducer in succession to derive correspondingly successive received signal values, the input circuit means having a single output for providing representations of the received signal values in the order in which they are derived;

memory circuit means having one read-in point coupled to the single output of the input circuit means, the memory circuit means being provided with a plurality of memory locations which are sequentially removed from the read-in point and each of which is capable of storing one received signal value representation, the number of memory locations being at least determined by the maximum time delay which must be imparted to the first interrogated received signal value, for storing each signal value representation appearing at the output of the input circuit means in succession so that each such representation, after read-in to the memory circuit means, consecutively occupies in steps the memory locations which are further removed from the read-in point;

output circuit means coupled to the memory circuit means for the non-destructive read-out of stored representations of interrogated signal values which were received from a number n of adjacent transducers, from those of the memory locations which correspond to required time delays with respect to the read-in point; and adding circuit means coupled to the output circuit means and responsive to signals therefrom, and having an output at which appears successive group signals for a corresponding succession of adjacent group characteristics, the improvement wherein said circuit arrangement further comprises:

integrating circuit means connected to the output of said adding circuit means for forming a representation of the mean value of a predetermined number of successive group signals;

time delay means connected to the output of said adding circuit means for delaying each group signal appearing at said adding circuit means output by a selected time which is no greater than the time interval over which the predetermined number of successive group signals appear at said adding circuit means output; and ratio forming means having inputs connected to receive each representation formed by said integrating circuit means and each delayed signal from said time delay means and having an output at which appears a representation of the signal to noise ratio of each successive group signal appearing at the output of said adding circuit means.

2. An arrangement as defined in claim 1 wherein said time delay means comprise a further memory circuit device.

3. An arrangement as defined in claim 1 wherein said integrating circuit means comprise a memory circuit device having a plurality of memory locations for storing representations of the values of the predetermined number of successive group signals, and calculating means connected to said locations of said memory circuit device for forming a representation of the sum of the representations stored in said memory locations divided by the predetermined number.

4. An arrangement as defined in claim 3 further comprising a clock pulse generator for generating clock pulses at a repetition rate equal to the rate at which successive group signals appear at said adding circuit means output, and wherein said memory circuit device is operated in a manner such that a representation of the value of each successive group signal appearing at said adding circuit means output is read in to said memory circuit device while that one of the previously stored representations which had been stored in said memory circuit device the longest is removed therefrom, and said delay means comprise a further memory circuit device having a plurality of successively connected memory locations and connected to said clock pulse generator for causing each group signal appearing at said adding means output to shift from one location to the next at the clock pulse repetition rate, whereby the selected delay time provided by said time delay means is determined by the total number of memory locations of said further memory circuit and the clock pulse repetition rate.

5. A system as defined in claim 3 further comprising a clock pulse generator for generating clock pulses at a repetition rate equal to the rate at which successive group signals appear at said adding circuit means output and connected for reading such group signal representations from said adding means output to a first one of said memory locations of said memory circuit device and shifting such representations between succeeding memory locations at the clock pulse repetition rate, and wherein a selected group of adjacent memory locations of said memory circuit device, starting with the first one of said locations, constitute said time delay means.

6. An arrangement as defined in claim 3 further comprising: a clock pulse generator for generating clock pulses at a repetition rate equal to the rate at which successive group signals appear at said adding circuit means output; a counter connected to count the clock pulses, starting from a reference moment, and having a first output producing a first count signal after counting a first given number of clock pulses starting from the reference moment, and a second output producing a second count signal after counting a second given number of clock pulses, equal to the predetermined number of successive group signals, following production of the first count signals; input gate means connected between said adding circuit means output and said integrating circuit means and time delay means, and connected to said counter, for supplying the successive group signals appearing at said adding circuit means output to said integrating circuit means and said time delay means only during the time between a first count signal and the next succeeding second count signal; and output gate means connected between said integrating circuit means and time delay means and said ratio forming means, and connected to said counter second output, for transferring the mean value representation formed by said integrating circuit means and the group signals after delay by said time delay means to said ratio forming means at the moment of appearance of a second count signal; and wherein said time delay means comprise a further memory circuit device.

7. An arrangement as defined in claim 6 wherein the time delay produced by said time delay means is equal to the time interval over which the predetermined number of successive group signals appear at said adding means output.

8. An arrangement as defined in claim 7 wherein said further memory circuit device has a plurality of memory locations for storing representations of the values of the predetermined number of successive group signals, and each said memory circuit is connected to said clock pulse generator to cause each stored representation to be shifted from one memory location to the next in response to each clock pulse.

9. An arrangement as defined in claim 1 wherein said ratio forming means comprise: a first logarithm function member connected to receive each mean value representation formed by said integrating circuit means; a second logarithm function member connected to receive each group signal after delay by said time delay means; and a difference forming member having two inputs each connected to a respective logarithm function member for receiving, at respective inputs, a representation of the logarithm of each mean value representation received by said first logarithm function member and a representation of the logarithm of the value of each group signal received by said second logarithm function member.

10. An arrangement as defined in claim 1 further comprising a logarithm function member connected to said adding circuit means output for forming a representation of the logarithm of the value of each successive group signal, and further connected to supply each logarithm representation which it forms to said integrating circuit means and said time delay means, and wherein said ratio forming means is constituted by a difference forming member.

* * * * *